United States Patent Office 3,500,712
Patented Mar. 17, 1970

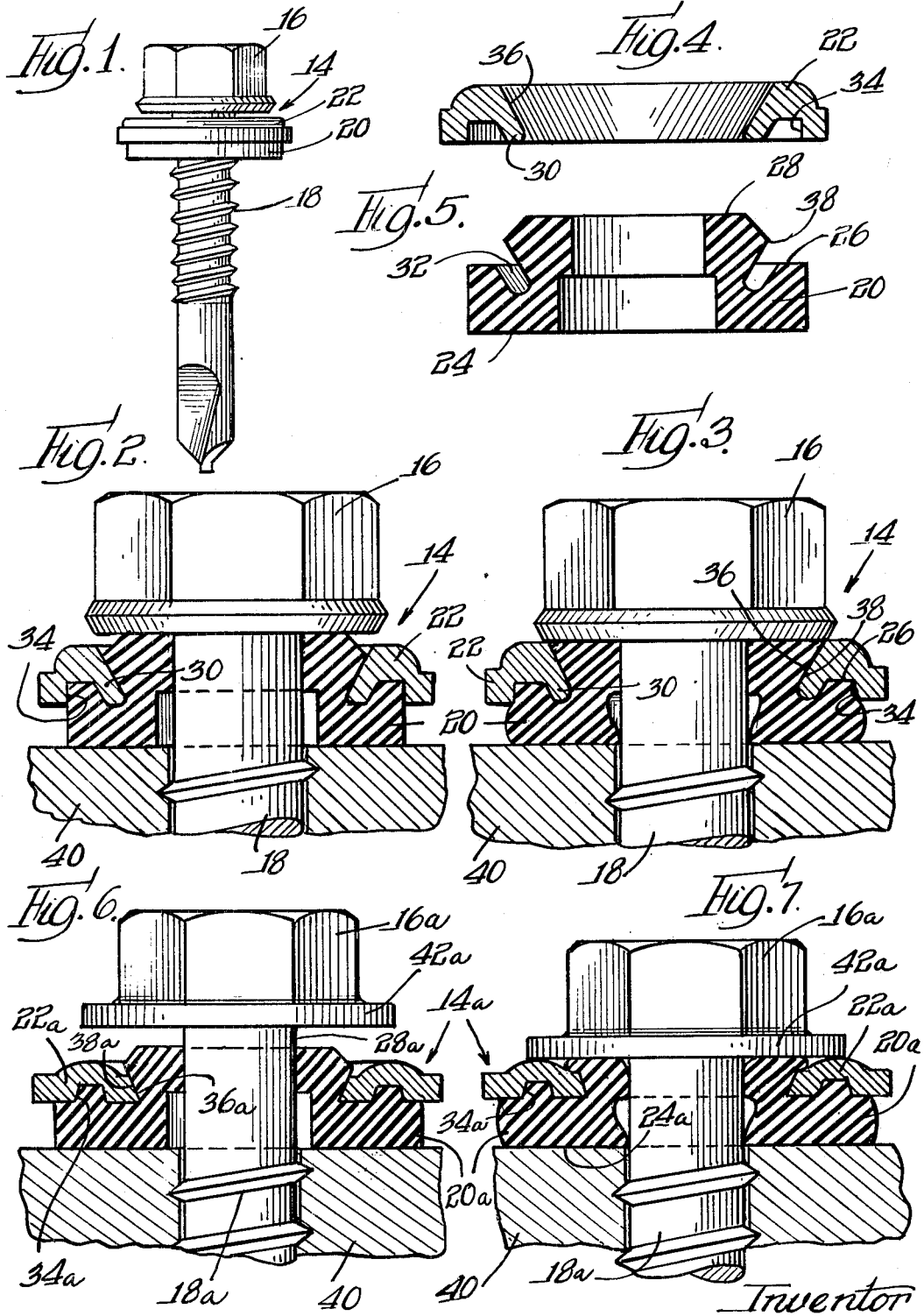

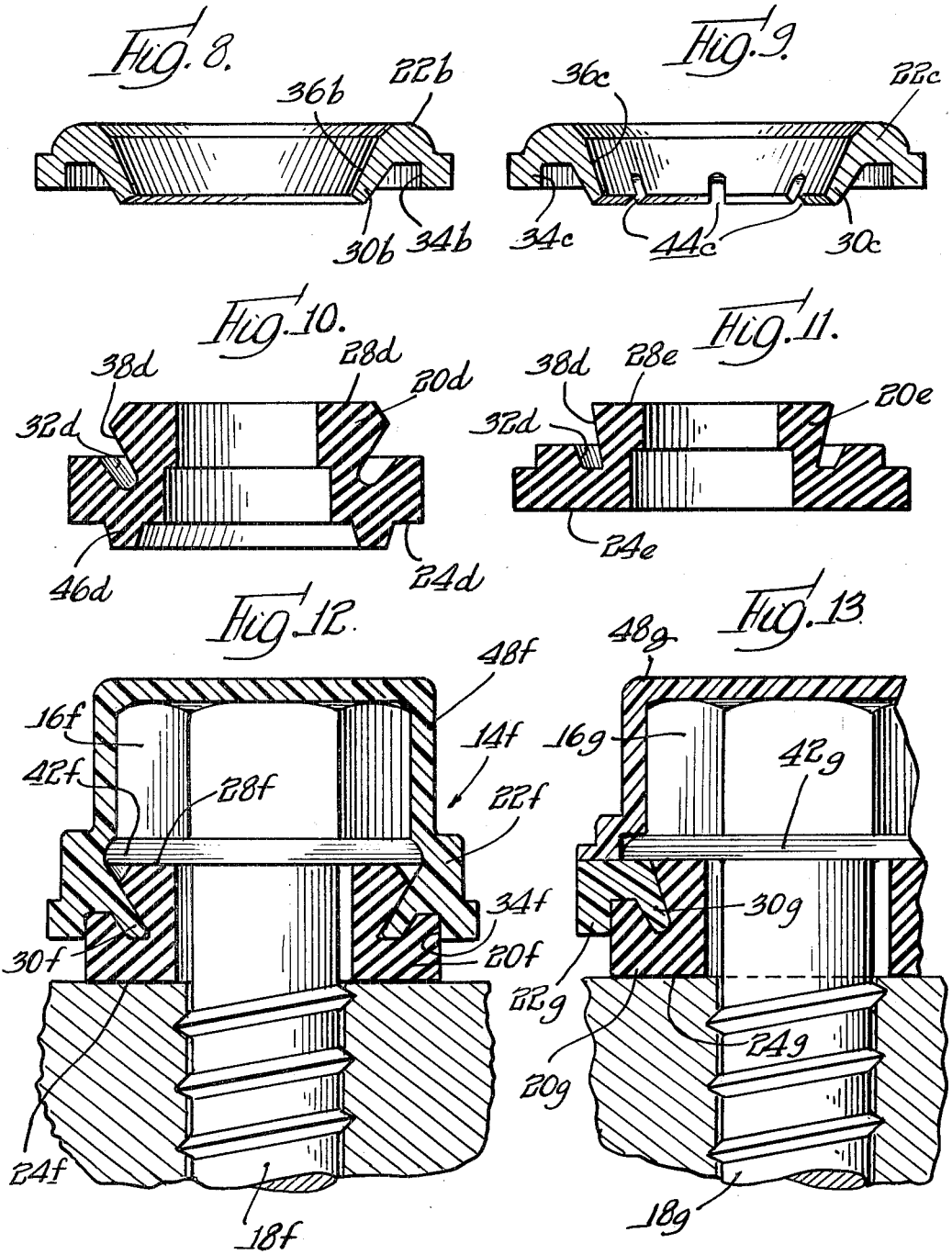

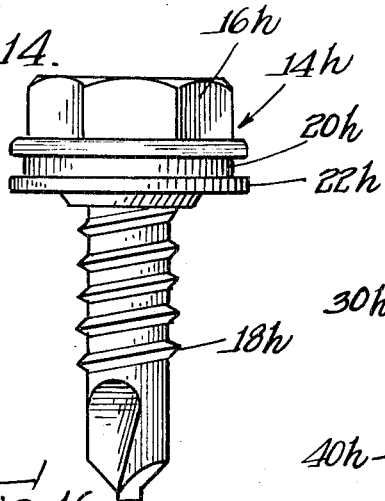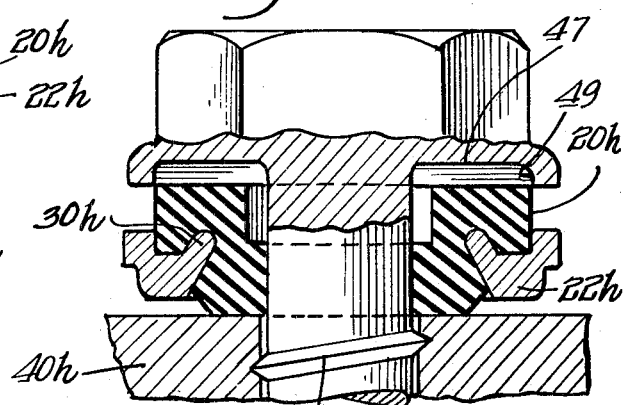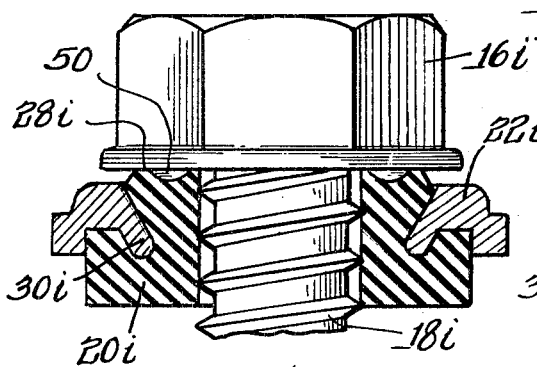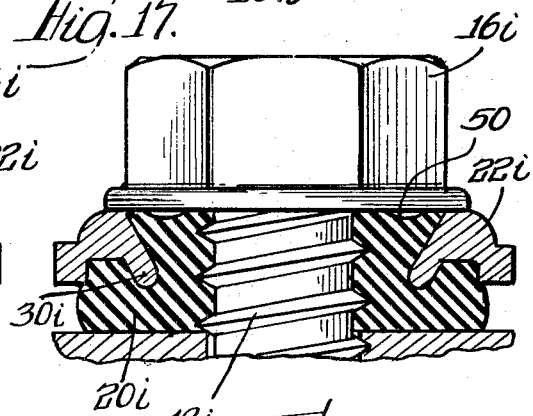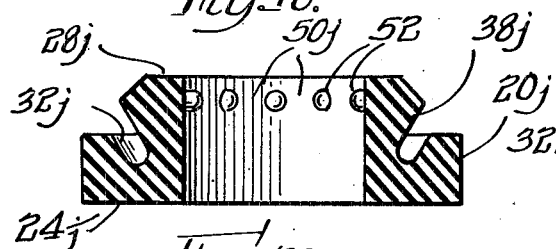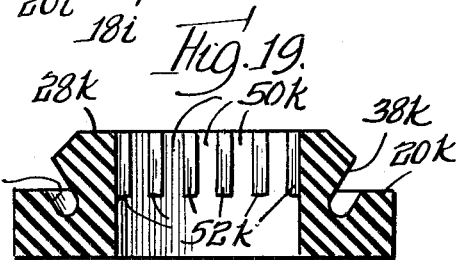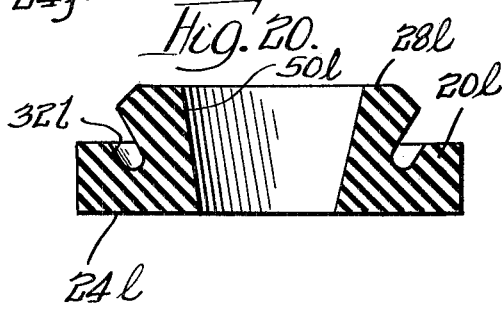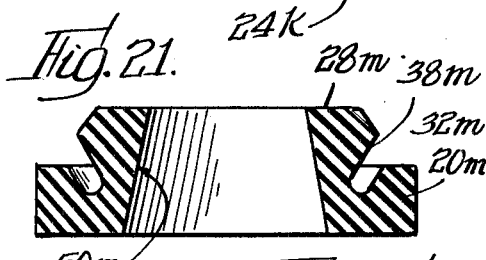

3,500,712
SEALING WASHER UNIT
David Prugh Wagner, Elmhurst, Ill., assignor to Illinois Tool Works Inc., Chicago, Ill., a corporation of Delaware
Filed July 11, 1968, Ser. No. 743,998
Int. Cl. F16b 35/00, 43/00
U.S. Cl. 85—1                    14 Claims

ABSTRACT OF THE DISCLOSURE

A washer unit comprising a sealing washer of rubberlike material and a preassembled relatively rigid washer member. The sealing washer presents a work clamping surface area on one side and a washer engaging a surface area on the opposite side. The rigid washer superimposes the sealing washer and has an annular flange portion embedded in recess means in the sealing washer and also a shoulder overlying an outer periphery of the sealing washer for restraining the tendency of said periphery to shift radially outwardly when the sealing washer is clamped against a work surface.

---

Rubberlike sealing washers have heretofore been associated with the clamping or underside of flat or slightly dished washers. In such instances there has been a tendency for the periphery of a sealing washer to be squeezed radially outward when subjected to axial clamping pressures resulting from the engagement therewith of the clamping side of a rotary threaded fastener such as a screw head or nut. To counteract this tendency, it has been common practice to bond the sealing washer to the underside of the metallic washer. In many applications, the above-mentioned combination of sealing and metallic washers have not proven satisfactory.

One of the important objects of the present invention is to provide a washer unit in the form of a preassembled sealing and relatively rigid washers without the necessity of employing bonding material. To this end the present invention contemplates a novel interlocking arrangement for securing the washer members against unauthorized axial separation.

It is a further object of the present invention to provide a preassembled washer unit as set forth above wherein novel and efficiently operable means is provided to prevent the outer periphery of the sealing washer from shifting radially outwardly when the washer is clamped against a work surface.

It is another important object of the present invention to provide a sealing washer unit of the type set forth above which may be produced very economically and which will function much more effectively than sealing washers heretofore available.

Still another object of the present invention is to provide a novel sealing washer unit constructed so that one size only be effectively used with complementary fasteners of different diameters.

The foregoing and other objects and advantages will be more apparent from the following detailed description when considered in connection with the accompanying drawings, wherein:

FIG. 1 is a side elevational view of a screw member equipped with a sealing washer unit which is representative of one embodiment of the present invention;

FIG. 2 is an enlarged fragmentary sectional view of the upper portion of the screw and washer combination illustrated in FIG. 1, the sealing washer and relatively rigid washer combined therewith being shown in section and in association with a workpiece prior to final clamping of the washer unit against the workpiece;

FIG. 3 is a view similar to FIG. 2, disclosing the sealing washer unit tightened against the workpiece;

FIG. 4 is a central sectional view of a relatively rigid washer disassociated from its companion sealing washer;

FIG. 5 is a central sectional view of the sealing washer separated from its companion rigid washer shown in FIG. 4;

FIG. 6 is a view similar to FIG. 2 disclosing a modified sealing washer unit or combination;

FIG. 7 discloses the washer unit of FIG. 6 finally clamped against the surface of a workpiece;

FIG. 8 is a central cross-sectional view similar to FIG. 4, disclosing a relatively rigid washer member of slightly modified form;

FIG. 9 is a cross-sectional view similar to FIG. 8 disclosing a still further modified form of washer wherein the free margin of the flange is formed with a plurality of circumferentially spaced slots or grooves;

FIG. 10 is a central cross-sectional view similar to FIG. 5 showing a sealing washer of modified form;

FIG. 11 is a sectional view similar to FIG. 10, disclosing another sealing washer of modified form;

FIG. 12 discloses a modified arrangement wherein the relatively rigid nonmetallic washer element includes as an integral portion thereof a cap section conforming substantially in cross-sectional shape to the head of the screw with which it is associated;

FIG. 13 is a view similar to FIG. 12 disclosing an arrangement whereby the cap portion which superimposes the screw head may be formed separately from the relatively rigid washer per se;

FIG. 14 is an elevational view showing a washer and screw assembly comprising a modification of the present invention;

FIG. 15 is an enlarged fragmentary partial sectional view of the assembly shown in FIG. 14;

FIG. 16 is a fragmentary partial sectional view showing a further embodiment of the present invention;

FIG. 17 is a view similar to FIG. 16 but shows the screw tightened for pressing the washer assembly against a work surface; and FIGS. 18 through 21 are respectively sectional views showing different resilient washers incorporating additional modifications of the present invention.

Referring now to the drawings more in detail, wherein like numerals have been employed to designate similar parts throughout the various figures, it will be seen that a sealing washer unit or preassembly designated generally by the numeral 14 is representative of one embodiment of the present invention. In FIG. 1 this washer unit 14 is shown in operative association with the clamping side of a screw head 16. The shank of the screw is designated by the numeral 18.

The sealing washer unit or preassembly 14 comprises a rubberlike annular sealing washer member 20 and a companion relatively rigid annular washer member 22, which may be formed of metal, rigid plastic material, fiber or the like. The sealing washer 20 presents a surface area 24 for clampingly engaging a workpiece, an annular surface area 26 adapted to be engaged by the rigid washer member 22, an an annular surface area 28 positioned radially inwardly of the surface 26 and spaced axially therefrom in position to be clampingly engaged by a rotary threaded fastener such as the clamping side of the screw head 16.

The washer member 22 includes a frustoconical flange member 30 which is adapted to nest within a complementary annular recess 32 of the sealing washer 20. The outer margin of the washer 22 presents shoulder means 34 which overlie a portion of the periphery of the sealing washer 20 as clearly shown in FIGS. 2 and 3. The flange 30 is adapted to be snapped around the beveled corner 35 and into the recess 32, so as to occupy the position shown in FIG. 2. During the assembling operation the sealing washer is temporarily slightly radially collapsed. Thereafter, forces tending to axially separate the washer members are resisted by the engagement of a conical surface 36 of the washer 22 with a complementary inclined or conical surface 38 of the sealing washer 20. The snug fit of the frustoconical flange 30 within the complementary annular recess 32 and the aforesaid impingement of the surfaces 36 and 38 effectively counteract unauthorized axial separation of the parts and eliminates the necessity of employing bonding material between the engaging surfaces of the washer members. Furthermore, after the washer assembly is positioned on the screw as shown in FIG. 2, engagement of the screw shank with the internal surface of the washer 20 positively prevents radial collapsing of the washer 20 and thus positively prevents axial separation of the parts 20 and 22.

As shown in FIG. 2, the minimum internal diameter of the washer 20 is similar to the diameter of the screw shank and preferably less than the crest diameter of the screw thread. The internal diameter of the washer 22 is substantially larger than the crest diameter of the screw threads. Thus the washer assembly may be applied to screw shanks having different diameter ranging from slightly less than the normal internal diameters of the resiliently compressible washer 20 to the internal diameter of the relatively rigid washer 22.

FIG. 2 discloses the preassembled washer unit 14 prior to tightening or clamping said unit against the surface of a workpiece 40. It will be noted that the clamping side of the screw head 16 initially engages the surface area 28 of the sealing washer. As the screw head 16 is finally tightened against the washer unit 14 (see FIG. 1), the inner periphery of the sealing washer 20 is forced laterally into firm engagement with the periphery of the screw shank 18, and the tendency for the sealing washer to be squeezed radially outwardly is resisted effectively by the shoulder means 34 of the washer member 22. The complementary frustoconical surfaces 36 and 38 of the washers 22 and 20 respectively, also function effectively during the tightening of the rotary threaded fastener against the sealiing washer to increase the agressiveness of sealing impingement of the washer 20 with the shank periphery.

In FIGURES 6 and 7 a slightly modified preassembled sealing washer unit is shown and is designated generally by the numeral 14a. A sealing washer 20a is preassembled with a relatively rigid washer member 22a as illustrated clearly in FIG. 6. The rotary threaded fastener member or screw illustrated in FIGS. 6 and 7 incorporates a screw head 16a which is provided with a flange 42a. This flange is adapted to be clamped against the upper annular surface of the washer 22a as shown in FIG. 7. As the washer unit 14a is finally clamped in position, the inner margin of the sealing washer folds upon itself as shown in FIG. 7 and in this position effectively presses against the periphery of the screw shank. Frustoconical surfaces 36a and 38a function similarly to the corresponding annular surfaces 36 and 38 heretofore described in connection with the disclosure in FIGS. 1-4 inclusive. The washer 22a also provides shoulder means 34a for counteracting the tendency for the outer periphery of the sealing washer to be squeezed radially outwardly.

In FIG. 8 a modified form of relatively rigid washer is shown, said washer being designated by the numeral 22b. The washer 22b is similar in all respects to the washer 22 previously described except that the annular flange 30b thereof extends below the plane which is coincident with the outer marginal clamping side of the washer. A shoulder means 34b functions similarly to the previously described shoulder means 34.

In FIG. 9 a washer member 22c is shown which is structurally similar to the washer 22b except that the washer 22c is provided with a series of circumferentially spaced recesses 44c along the free margin of the flange 30c. The nature and size of the sealing washer will determine the aggressiveness with which it is desired to have the free edge of the washer flange pressed into the material of the sealing washer. By providing the circumferentially spaced recesses 44c, the tendency for the free or terminating edge of the flange 30c to imbed itself within the material of the sealing washer at the bottom of the annular recess, is somewhat reduced. In all other respects the washer 22c is similar to the washer 22b.

In FIGS. 10 and 11, slightly modified sealing washer structures are shown. The sealing washer shown in FIG. 10, designated by the numeral 20d is quite similar to the previously described sealing washer 20. The sealing washer 20d differs therefrom in the provision of an annular rib 46d on the work clamping side of the washer. In certain applications it has been found practical to incorporate this annular rib 46d. FIG. 11 discloses a sealing washer designated generally by the numeral 20e, which varies slightly in cross-sectional contour from the previously described washer 20.

In certain applications the relatively rigid washer members previously described may be formed integral with a cap for enclosing the screw head. Thus in FIG. 12 a washer portion 22f, which is structurally similar to the washer 22 previously described, is formed integral with a cap section 48f. This cap 48f conforms with the polygonal shape of the screw head and thus may accommodate a turning tool or wrench. The various elements of the combination disclosed in FIG. 12 corresponding with similar elements previously described are given like numerals bearing the suffix f.

FIG. 13 is a similar structure to FIG. 12 except that the cap designated by the numeral 48g is not formed integral with the rigid washer portion 22g. Like numerals bearing the suffix g are employed in FIG. 13 to designate elements corresponding with those shown in the other figures. The cap sections 48f and 48g may be formed or molded from suitable relatively rigid nonmetallic materials such as plastic or fibrous materials.

FIGS. 14 and 15 show a modified arrangement wherein elements corresponding to those above are designated by the same reference numerals with the suffix h added. In this embodiment, the elements are similar to those of FIGS. 1–5, but in this embodiment, the washer unit is assembled with the screw in an inverted position relative to the washer unit of FIGS. 1–5 arrangement. Furthermore, the screw head has a hollowed clamping surface 47 comprising a beveled outer marginal portion 49 for aiding in confining the resilient washer.

FIGS. 16 and 17 show another embodiment wherein elements corresponding to those previously described are designated by the same reference numerals with the suffix i added. In this embodiment, the thread convolutions 18i extend along the shank substantially to the head 16i of the screw. Thus the inner surface of the resilient washer 20i directly engages the crests of the screw threads as shown in FIG. 16. It is to be understood that all of the other embodiments disclosed herein may similarly use a screw with threads extending to the head. In this embodiment, the internal diameter of the resilient washer is uniform throughout its axial length, but the internal diameter could be stepped in the same manner as washers of FIGS. 1 through 11 provided that the axial length of the minimum diameter step is at least as great as one full pitch of the screw thread for assuring proper interengagement between the washer and the thread.

As previously indicated, all of the washer units disclosed herein are adapted to be assembled with screws of different diameters. When a relatively large diameter screw is used, the resilient washer will, of course, be stretched and expanded around the screw shank. The volume of resilient washer material may be too great to be properly accommodated in the reduced space between the periphery of the screw shank and the flange 30i. In order to accommodate such excess washer material when the fastener assembly is tightened as shown in FIG. 17, an annular recess 50 is formed in the upper surface 28i of the resilient washer. As indicated in FIG. 17, the washer material is pressed during tightening of the fastener so as substantially to fill the recess 50. Furthermore, a portion of the washer material may be forced into the spaces between the helical thread convolutions.

FIGS. 18 through 21 respectively show resilient washers 20j, 20k, 20l and 20m which are adaptable for use with each of the relatively rigid washers and the screws and the arrangement thereof previously described herein. These embodiments respectively disclose different means corresponding to the recess 50 for providing space into which excess washer material may be forced, particularly when the washer is used with a relatively large diameter screw. In FIG. 18 the washer is provided with an annular ring of spaced inwardly directed projections 52 which are engageable with the screw shank or screw threads so as to povide a space 50j between the shank and threads, at least prior to the clamping of the washer against a work surface. In FIG. 19, similarly functioning projections in the form of axially extending ribs 52k are provided. In FIGS. 20 and 21 the internal walls of the washer are oppositely tapered so that the smaller ends thereof are adapted to engage the screw shank while annular spaces 50l and 50m are provided at the larger ends thereof.

From the foregoing it will be apparent that the present invention contemplates the provision of a very practical and efficently operable sealing washer unit. The necessity of bonding the sealing washer to its companion washer is eliminated and means is provided for mechanically securing the washer members against unauthorized axial separation. It will also be clear from the foregoing description that the novel structural arrangement of the preassembled sealing washer and relatively rigid washer is such as to prevent the outer periphery of the sealing washer member from being squeezed radially outwardly when finally clamped against a work surface. The term "relatively rigid washer member or element" is used advisedly to include metallic as well as nonmetallic washers which are sufficiently rigid when compared to the rubber-like sealing washer whereby to effectively clamp the unit into firm sealing engagement with a work surface and also into sealing engagement with the periphery of an associated screw member. It should also be understood that in using the term "relatively rigid washer member" it is contemplated that the washer member could be in the form of an annulus per se, or an annulus having in association therewith a cap portion for encapsulating a companion screw head as disclosed and described herein. The sealing washer unit contemplated hereby may be used in association with the clamping side or surface of a nut as well as the clamping side of a screw head.

The invention is claimed as follows:

1. A sealing washer unit comprising an annular rubber-like sealing washer member and a companion relatively rigid annular washer member, said sealing washer member presenting a first clamping surface area on one side, a washer engaging surface area on the opposite side and a second clamping surface area on said opposite side positioned adjacent the inner margin of the sealing washer, said sealing washer having flange accommodating recess means located intermediate the inner and outer margins thereof and extending from said washer engaging surface area toward but terminating short of said first clamping surface area, said recess means being defined by a pair of side walls and an end wall, and said relatively rigid washer member adjacently superimposing said washer engaging surface area and having substantially frustoconical flange means complemental to and positioned within said recess means so as to be substantially embedded in said sealing washer, said sealing washer including a peripheral edge portion radially outwardly of said flange means, the radially outer margin of said relatively rigid washer member having shoulder means extending generally axially toward said first clamping surface area and overlying and engaging said peripheral edge portion, the axial extent of said shoulder means being at least similar to that of said flange means, an annular part of said sealing washer being confined between said shoulder means and said flange means, said shoulder means terminating short of said first clamping surface area and restraining any tendency for the periphery of the sealing washer to shift radially outwardly when the sealing washer is clamped against a work surface, said frustoconical flange means tapering away from said shoulder means in a direction toward said first clamping surface area for directing inner marginal portions of said sealing washer generally radially inwardly when the sealing washer is clamped against a work surface.

2. A sealing washer unit is set forth in claim 1 wherein the free margin of the flange means is circumferentially continuous.

3. A sealing washer unit as set forth in claim 1 wherein the free margin of the flange means defines a circumferentially disposed edge which is interrupted at spaced intervals.

4. A sealing washer unit as set forth in claim 1 wherein the sealing washer member includes circumferential rib means associated with the first clamping surface area thereof.

5. A sealing washer unit as set forth in claim 1, wherein said sealing washer member comprises an inner marginal portion having a first diameter and being engageable with a complementary fastener such as a screw shank, and said relatively rigid annular washer has a minimum internal diameter substantially greater than said first diameter for avoiding any contact with the screw shank, said inner marginal portion of the sealing washer being resiliently expandable for enabling the washer unit to be associated with screw shanks of different diameters.

6. In combination a sealing washer unit comprising an annular rubber-like sealing washer member and a companion relatively rigid annular washer member, said sealing washer member presenting a first clamping surface area on one side, a washer engaging surface area on the opposite side, and a second clamping surface area on said opposite side positioned adjacent the inner margin of the sealing washer, said sealing washer having flame accommodating recess means located intermediate of the inner and outer margins thereof and extending from said washer engaging surface toward but terminating short of said first clamping surface area, whereby said recess means is defined by a pair of side walls and end wall, said relatively rigid washer member adjacently superimposing said washer engaging surface area and having flange means complemental to and positioned within said recess means so as to be substantially embedded within said sealing washer, the radially outer margin of said relatively rigid washer member having shoulder means extending axially therefrom toward said first clamping surface area to overlie a portion of the sealing washer whereby to counteract any tendency for the periphery of the sealing washer to shift radially outwardly when the sealing washer is clamped agains a work surface, a rotary threaded clamping member having a clamping surface positioned adjacent the second clamping surface area of the sealing washer member, and a cap section forming an axial continuation of the relatively rigid washer member, said cap encapsulating the exterior of said rotary threaded clamping member.

7. The combination as set forth in claim 6 wherein the cap member is formed integral with the relatively rigid washer member.

8. The combination as set forth in claim 6 wherein said cap member is formed of nonmetallic, moldable plastic material.

9. The combination as set forth in claim 6 wherein the cap and relatively rigid washer member are molded as an integral unit of nonmetallic material.

10. The combination as set forth in claim 6, wherein said rotary threaded clamping member comprises a screw shank extending through said washer unit, said shank having a diameter less than the minimum diameter of the flange means of the relatively rigid washer member, said sealing washer including an annular portion between said shank and said flange means, and recess means in said annular portion into which material of the sealing washer may be forced when the washer unit is clamped against a work surface.

11. The combination as set forth in claim 10, wherein said recess means is formed in said second clamping surface.

12. The combination as set for in claim 10, wherein said sealing washer includes inwardly extending projections engaging said shank, and said recess means is disposed between said projections.

13. The combination as set forth in claim 10, wherein said sealing washer includes inner wall means surrounding said shank, one portion of said inner wall means having a diameter less than the diameter of said shank and being in engagement with said shank, and another portion of said inner wall means having a diameter greater than said shank and defining said recess means.

14. The combination as set forth in claim 6, wherein said clamping surface is hollowed and comprises an axially extending portion embracing a part of the sealing washer for restraining radial expansion of said part of the sealing washer when the sealing washer is clamped against a work surface.

References Cited

UNITED STATES PATENTS

| | | | |
|---|---|---|---|
| 2,852,291 | 9/1958 | Hults | 85—1 |
| 2,982,573 | 5/1961 | McKee | 85—1 |
| 3,286,577 | 11/1966 | Weidner | 85—1 |
| 3,399,589 | 9/1968 | Breed | 85—1 |

FOREIGN PATENTS

| | | |
|---|---|---|
| 993,021 | 5/1965 | Great Britain. |
| 374,858 | 3/1964 | Switzerland. |

RAMON S. BRITTS, Primary Examiner

U.S. Cl. X.R.

85—50

UNITED STATES PATENT OFFICE
CERTIFICATE OF CORRECTION

Patent No. 3,500,712           Dated March 17, 1970

Inventor(s) David P. Wagner

It is certified that error appears in the above-identified patent and that said Letters Patent are hereby corrected as shown below:

Col. 6, line 16, "is" should be --as--;
Col. 6, line 44, "flame" should be --flange--.

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents